(12) United States Patent
Kim et al.

(10) Patent No.: US 7,534,826 B2
(45) Date of Patent: May 19, 2009

(54) PAINT COMPOSITION HAVING IMPROVED FAR-INFRARED EMISSIVITY, ANTIBIOSIS AND SOLVENT RESISTANCE, AND PRECOATED METAL SHEET COATED THE SAME

(75) Inventors: Jin-Tae Kim, Pohang (KR); Byung-Kuk Jung, Pohang (KR); Yeong-Sool Jin, Pohang (KR)

(73) Assignee: POSCO, Pohang (KR)

( * ) Notice: Subject to any disclaimer, the term of this patent is extended or adjusted under 35 U.S.C. 154(b) by 270 days.

(21) Appl. No.: 10/584,868

(22) PCT Filed: Dec. 27, 2004

(86) PCT No.: PCT/KR2004/003454

§ 371 (c)(1),
(2), (4) Date: Jun. 29, 2006

(87) PCT Pub. No.: WO2005/063898

PCT Pub. Date: Jul. 14, 2005

(65) Prior Publication Data

US 2007/0149674 A1   Jun. 28, 2007

(30) Foreign Application Priority Data

Dec. 30, 2003 (KR) .................. 10-2003-0099569
Dec. 24, 2004 (KR) .................. 10-2004-0112446

(51) Int. Cl.
C08K 3/20 (2006.01)
C08K 3/22 (2006.01)
C08K 3/26 (2006.01)
C08K 3/32 (2006.01)
C08K 5/16 (2006.01)

(52) U.S. Cl. ............... 524/261; 524/417; 524/425; 524/430; 524/432; 524/433; 523/122; 427/457; 427/458

(58) Field of Classification Search ............... 524/261, 524/417, 425, 430, 432, 433; 523/122; 428/457, 428/458

See application file for complete search history.

(56) References Cited

U.S. PATENT DOCUMENTS

| | | | |
|---|---|---|---|
| 6,022,919 A | 2/2000 | Komoto et al. | |
| 6,103,387 A | 8/2000 | Yamamoto et al. | |
| 6,221,498 B1 | 4/2001 | Takahama et al. | |
| 6,376,559 B1 | 4/2002 | Komoto et al. | |
| 6,390,487 B1 | 5/2002 | Yoo | |
| 6,773,803 B2* | 8/2004 | Lee et al. | 428/323 |
| 2004/0249012 A1* | 12/2004 | Tanaka et al. | 522/83 |

FOREIGN PATENT DOCUMENTS

| | | | |
|---|---|---|---|
| JP | 11335596 | * | 12/1999 |
| JP | 2001-137711 A | | 5/2001 |
| JP | 2002-053812 A | | 2/2002 |
| JP | 2003-171604 A | | 6/2003 |
| KR | 1989-0013156 A | | 9/1989 |
| KR | 1997-7006363 A | | 11/1997 |
| KR | 10-0214449 A | | 5/1999 |
| KR | 2000-053934 A | | 5/2000 |
| KR | 10-0310196 B1 | | 9/2001 |
| KR | 2002-0008070 A | | 1/2002 |
| KR | 2003-052373 A | | 6/2003 |
| WO | 02087339 A1 | | 11/2002 |

OTHER PUBLICATIONS

Derwent Abstract ACC- No. 2000-092747, JP 11335596, Dec. 7, 1999, pp. 1-3.*
Abstract, Korean Intellectual Property Office, Publication No. 100146451 B1, published May 11, 1998, entitled "Multipurpose Stone Powder Emitting Far Infrared Rays and Anions and Preparation Thereof", Inventor: Park, Jong Cheol; Applicant: Kim, Sung Kon et al.

* cited by examiner

Primary Examiner—Kriellion A Sanders
(74) Attorney, Agent, or Firm—The Webb Law Firm

(57) ABSTRACT

Disclosed is a paint composition having high far-infrared emissivity, antibiotic activity and solvent resistance and a precoated metal sheet for home appliances, coated with the paint composition. The paint composition includes a thermosetting resin, 9-60 parts by weight of ceramic powder and 0.2-4.0 parts by weight of phosphoric acid, based on 100 parts by weight of the thermosetting resin, is provided, and a precoated metal sheet coated with such a paint composition is also provided. The paint composition and the precoated metal sheet coated with the paint composition manifest high far-infrared emissivity and antibiotic activity, and as well, have storage stability and solvent resistance increased by neutralizing the alkalinity of ceramic powder using phosphoric acid. Further, a silane compound and a curing catalyst are additionally used to increase gloss and processability.

29 Claims, No Drawings

PAINT COMPOSITION HAVING IMPROVED FAR-INFRARED EMISSIVITY, ANTIBIOSIS AND SOLVENT RESISTANCE, AND PRECOATED METAL SHEET COATED THE SAME

TECHNICAL FIELD

The present invention relates, in general, to a paint composition having high far-infrared emissivity, antibiotic activity and solvent resistance, and a precoated metal sheet coated with such a paint composition. More particularly, the present invention relates to a paint composition for use in home appliances, which has high gloss, processability and storage stability, as well as high far-infrared emissivity, antibiotic activity and solvent resistance, and a precoated metal sheet coated with the paint composition.

BACKGROUND ART

Generally, solar light reaches the earth while electric and magnetic fields fluctuate, like a wave, and has heat, and thus, is called 'thermal rays'. Light is classified into X-rays, ultraviolet rays, visible light, infrared rays, etc., depending on particles, waves and frequencies of vibration, and X-rays are permeable, ultraviolet rays and visible light are reflexible, and infrared rays are absorbable. Of infrared rays, far-infrared rays have a longer wavelength than visible light, and thus, are regarded as a sort of electromagnetic wave having a frequency of 1.5-1000 μm. Far-infrared rays, which are light energy having a slightly longer wavelength of 5-25 μm among infrared rays, have been used for various purposes from far-infrared sauna to home appliances, construction materials, general living goods, etc., because they have been determined to be beneficial to human beings in recent years.

To manifest biofunctions, far-infrared emissivity should be not less than 0.9. Further, antibiotic activity is assayed by measuring the rate of bacterial reduction using *Escherichia coli* and *Pseudomonas aeruginosa*. In particular, in the case of a precoated metal sheet for use in home appliances, it should have high processability and gloss.

As a conventional technique concerned with a paint composition having far-infrared emissivity, Korean Patent Application No. 1997-18446 discloses the use of a material emitting far-infrared rays by impregnating zeolite with Zn and Ag. However, the material used is expensive, thus negating economic benefits, and also, the far-infrared emissivity is as low as 0.90.

On the other hand, the paint for precoated metal sheets used for construction materials need be hardly processed; it has larger amounts of fillers. Of the fillers, silica is added in a relatively large amount of 10-15 parts by weight, which has been used to decrease the alkalinity of conventional far-infrared emitting powder. However, in the case of the paint for precoated metal sheets used for home appliances, silica undesirably acts to retard the processability.

As the far-infrared emitting material, jade and elvan (Korean Patent Application Nos. 1988-0001616 and 1995-0026761) are representatively known. In Japanese Patent Laid-open Publication No. 2002-53812, a paint including apatite, torumaline and charcoal to emit far-infrared rays and anions is disclosed. However, since the materials mentioned above are expensive and have a large particle size, they are unsuitable for use in precoated metal sheets.

Japanese Patent Laid-open Publication No. 2003-171604 discloses an antibacterial coating material comprising a silicone resin and antibacterial photocatalytic powder. However, such a paint is unsuitable for precoated metal sheets for home appliances due to its low processability.

Korean Patent Application No. 1998-709300 discloses an anti-fouling silicone emulsion coating composition. However, it is difficult to use such a composition in the fields requiring processability. In addition, since silicone functions as a matting agent, the above composition is unsuitable for use in highly glossy products.

Japanese Patent Application No. 1999-319848 discloses a method of forming a photocatalytic layer which has excellent alkali resistance and water resistance using a silicone modified acryl resin. However, the use of silicone modified acryl resin results in decreased processability and gloss, and the above resin is undesirable as a resin component for use in precoated metal sheets.

U.S. Pat. No. 6,376,559 discloses a method of preparing a coating composition comprising a dispersing component having an inorganic silica sol dispersed in a solvent. However, the solution system used in the above invention is unsuitable for a coating process.

Korean Patent Application No. 1997-702389 discloses a thermosetting composition having high anti-fouling characteristics, weather resistance and chemical resistance using a ceramic component, a coating finish method and a coated article, and Korean Patent Application No. 2001-43214 discloses a urethane based coating resin composition having high gloss, weather resistance, hardness and flexibility, and a curing coating composition including the same. In addition, U.S. Pat. No. 6,022,919 discloses a coating composition comprising a resin produced by copolymerizing monomers containing methacrylate ester, OH group, COOH group, styrene and acrylonitrile. However, the coating compositions as mentioned above do not exhibit far-infrared emissivity (emission), antibiotic activity, solvent resistance, gloss, processability and storage stability to the extent of being suitable for use in precoated metal sheets for home appliances.

SUMMARY OF THE INVENTION

Accordingly, the present invention has been made keeping in mind the above problems occurring in the related art, and an object of the present invention is to provide a paint composition having high antibiotic activity, far-infrared emissivity and solvent resistance.

Another object of the present invention is to provide a paint composition having high gloss, processability and storage stability, as well as high antibiotic activity, far-infrared emissivity and solvent resistance.

A further object of the present invention is to provide a precoated metal sheet coated with the paint composition having high antibiotic activity, far-infrared emissivity and solvent resistance.

Yet another object of the present invention is to provide a precoated metal sheet coated with the paint composition having high gloss, processability and storage stability, as well as high antibiotic activity, far-infrared emissivity and solvent resistence In order to accomplish the above objects, according to one aspect of the present invention, a paint composition is provided, which comprises a thermosetting resin, 9-60 parts by weight of ceramic powder and 0.2-4.0 parts by weight of phosphoric acid, based on 100 parts by weight of the thermosetting resin.

According to another aspect of the present invention, a precoated metal sheet coated with the paint composition is provided.

DETAILED DESCRIPTION OF THE INVENTION

Hereinafter, a detailed description will be given of the present invention.

According to the present invention, a paint composition comprising ceramic powder is provided, thus exhibiting high far-infrared emissivity and antibiosis. Further, phosphoric acid is used, instead of silica, to control the alkalinity. Thereby, the problem of low processability due to conventional use of silica is overcome, and solvent resistance and storage stability are increased. Moreover, a silane compound and a curing catalyst are used to improve gloss of the coated film and further harden the coated film.

The ceramic powder used in the present invention includes at least one alkali oxide selected from the group consisting of $CaCO_3$, $ZnO$, and $Al_2O_3$ powder, which has high far-infrared emissivity. In addition, the ceramic powder may further include Al—Zn powder.

However, since the ceramic powder has high alkalinity, solvent resistance and storage stability of the paint are lowered. Also, high gloss and high processability required for use in home appliances cannot be exhibited. In particular, due to low solvent resistance, the coated surface is discolored and damaged when being exposed to the solvent (methylethylketone: hereinafter, abbreviated as 'MEK'). Such phenomena do not occur upon preparation of a paint for use in construction materials. The reason is that the paint for precoated metal sheets for use in construction materials is not processed much, and hence, includes large amounts of fillers. Of the fillers, silica having an acidic group is added in an amount of 10-15 parts by weight, based on 100 parts by weight of the resin, and functions to neutralize the alkalinity of the ceramic component in the paint. However, the paint composition which is used for home appliances, instead of for construction materials, as in the present invention, does not include silica. If silica is used in the present invention, processability may be deteriorated.

Therefore, with the aim of solving the problems caused by the ceramic powder, the paint composition for precoated metal sheets of the present invention includes ceramic powder and phosphoric acid mixed at a predetermined ratio, whereby the alkalinity attributed to the ceramic component is reduced and the stability and solvent resistance of the paint can be improved. Further, a silane compound and a curing catalyst are additionally used to increase the gloss and hardness of the coated film. The paint composition of the present invention, which is to be used for metal sheets for home appliances, preferably has a thermosetting resin having a higher molecular weight than a thermosetting resin conventionally used for construction materials. Commonly, the thermosetting resin for construction materials has a molecular weight of 3000 to 4000. In the case of using the thermosetting resin having a molecular weight of 3000-4000, processability becomes insufficient. Hence, in the present invention, the thermosetting resin, which has a molecular weight of 10,000 or more, and preferably 10,000-20,000, is used to manifest processability required for home appliances.

As the thermosetting resin, any resin may be used so long as it is usable for a paint for precoated metal sheets, and includes polyester resin, silicone modified polyester resin or acryl resin, but is not limited thereto. Preferably, a polyester resin or an acryl resin is used. The above resin is inexpensive and has high corrosion resistance and solvent resistance, and thus, can be preferably used. The resin may be used alone or in combination with other kinds of resins. However, since every resin has different curing and processing conditions, it is preferable that one kind of resin be used alone. TK A5 8

The ceramic powder includes at least one selected from the group consisting of $CaCO_3$, $ZnO$ and $Al_2O_3$ powder, and may further include Al—Zn powder. The ceramic powder, which exhibits far-infrared emissivity and antibiotic activity, is used in an amount of 9-60 parts by weight, preferably 15-30 parts by weight, and more preferably 9-30 parts by weight, based on 100 parts by weight of the thermosetting resin. If the ceramic powder is used in an amount less than 9 parts by weight, far-infrared emissivity and antibiosis are decreased. Meanwhile, if the ceramic powder is used in an amount exceeding 60 parts by weight, although far-infrared emissivity and antibiosis are increased, processability and gloss are lowered, and also, solvent resistance is undesirably reduced.

Upon preparation of the paint, two or three kinds of ceramic powder may be used. Based on 100 parts by weight of the thermosetting resin, 3-20 parts by weight of $CaCO_3$, 3-20 parts by weight of $ZnO$ and 3-20 parts by weight of $Al_2O_3$, preferably 5-10 parts by weight of $CaCO_3$, 5-10 parts by weight of $ZnO$ and 5-10 parts by weight of $Al_2O_3$, and more preferably 3-10 parts by weight of $CaCO_3$, 3-10 parts by weight of $ZnO$ and 3-10 parts by weight of $Al_2O_3$ are used.

Further, the Al—Zn ceramic powder is additionally used in an amount of 3-20 parts by weight, based on 100 parts by weight of the thermosetting resin. In the case where the Al—Zn ceramic powder is additionally included, the Al—Zn ceramic powder and at least one ceramic powder selected from the group consisting of $CaCO_3$, $ZnO$ and $Al_2O_3$ powder are mixed within their use ranges, respectively, so that their amounts total 9-60 parts by weight, preferably 15-30 parts by weight, and more preferably 9-30 parts by weight, based on 100 parts by weight of the thermosetting resin.

The ceramic powder has a particle size of 1-20 μm, and preferably 1-15 μm. Since the coated film is formed in a thickness of 5-25 μm, if the particle size is larger than the above thickness, the ceramic powder protruding from the coated film may negatively affect corrosion resistance and outer appearance.

In addition, to decrease the alkalinity increased by using the ceramic powder and increase the solvent resistance, phosphoric acid is mixed along with the thermosetting resin and the ceramic powder. The use of phosphoric acid results in decreased alkalinity and increased solvent resistance. As well, storage stability is improved.

Phosphoric acid is used in an amount of 0.2-4.0 parts by weight, and preferably 0.5-2.0 parts by weight, based on 100 parts by weight of the thermosetting resin. In the case where the ceramic powder is used in a small amount, for example, an amount less than 9 parts by weight, based on 100 parts by weight of the thermosetting resin, the alkalinity can be sufficiently inhibited even though phosphoric acid is used in an amount less than 0.2 parts by weight. However, in the case where an excessive amount of ceramic powder is used to increase the far-infrared emissivity, the above amount of phosphoric acid is insufficient to decrease the alkalinity of the ceramic powder. On the other hand, if phosphoric acid exceeds 4.0 parts by weight, acidity is too strong, and thus, the paint may be agglomerated, resulting in lowered storage stability.

In addition, the paint composition of the present invention further includes 0.01-1.0 parts by weight of the silane compound, based on 100 parts by weight of the thermosetting resin, if required. The silane compound functions to harden the coated film and increase the gloss of the film. If the silane compound is used in an amount less than 0.01 parts by weight, desirable properties caused by the addition of the silane compound are hardly manifested. Conversely, if the amount of the silane compound exceeds 1.0 part by weight, unreacted silane compound remains in the paint. After such a paint composition is applied on the metal sheet, the resultant film has poor properties, and the resin agglomerates, thus reducing the storage stability.

The silane compound includes at least one selected from the group consisting of mercapto-propyl-trimethoxysilane, 3-aminopropyltriethoxy silane, 3-trimethoxysilylpropyl methacrylate and 3-aminopropyltrimethoxy silane, but is not limited thereto.

In addition, the paint composition of the present invention further includes the curing catalyst so as to increase the gloss of the coated film and further harden the film, if required. The curing catalyst functions to shorten the curing time of the film prolonged due to the addition of large amounts of ceramic powder and pigment. Thereby, the coated film has high gloss and becomes harder.

The curing catalyst is used in an amount of 2-6 parts by weight, based on 100 parts by weight of the thermosetting resin. If the curing catalyst is used in an amount less than 2 parts by weight, the curing time is hardly shortened. Meanwhile, if the curing catalyst is used in an amount exceeding 6 parts by weight, the coated film is cured too fast, that is, the film is cured before it obtains a desired smoothness, thus negating economic benefits. The curing catalyst includes dodecylbenzenesulfonic acid, but is not limited thereto.

Moreover, an additive, such as a dispersing agent, a leveling agent or a thickening agent, which is generally added to a paint composition for precoated metal sheets, is additionally used so that the total amount of each additive to be used satisfies 1.0-7.0 parts by weight, based on 100 parts by weight of the thermosetting resin, if required. The total amount of the additive is not limited to an amount generally used in the art, and may be appropriately used depending on the desired properties.

Moreover, a coloring pigment, which is generally added to a paint composition for precoated metal sheets, is additionally used so as to exhibit hiding power of the coated film, if required. The coloring pigment is used in an amount of 10-80 parts by weight, based on 100 parts by weight of the thermosetting resin. If the above amount is less than 10 parts by weight, the metal sheet has no hiding power. On the other hand, the coloring pigment exceeding 80 parts by weight negatively affects processabilty and gloss.

The kinds and amounts of the additive, such as dispersing agent, leveling agent or thickening agent, and the coloring pigment are generally known in the art, and thus, may be appropriately selected by those skilled in the art when preparing the paint. The kinds and amounts of the additive and the pigment are not particularly limited.

To control the viscosity of the paint composition to be prepared, thinner that is a solvent is used in an appropriate amount, in which its amount is appropriately controlled in accordance with techniques generally used in the art. For example, the viscosity is controlled so that the time required to discharge the paint composition from a ford cup #4 is 100-120 sec, but is not limited thereto.

The paint composition of the present invention is prepared by uniformly dispersing the ceramic powder in the thermosetting resin at 1000-5000 rpm using a high speed distributor, and then adding phosphoric acid serving to ensure solvent resistance while decreasing the alkalinity to the thermosetting resin having ceramic powder dispersed therein. Subsequently, the silane compound, the curing catalyst, and the additive are used to prepare the paint composition which is formed into a hard film having high gloss, if required.

According to the present invention, a precoated metal sheet coated with such a paint composition is provided, which exhibits high far-infrared emissivity, antibiotic activity, solvent resistance, gloss, processability and storage stability.

As such, the above coating method is not particularly limited in the present invention, and the coated film is manufactured by a top coating of applying the paint composition of the present invention to a dry film thickness of 5-25 μm, preferably 15-20 μm, and more preferably 15 μm, on an iron steel material, more specifically, a zinc coated steel sheet that is typically pretreated and under coated, and then drying it at 200-250° C. The paint composition of the present invention may be applied, for example, on steel sheets for home appliances.

If the coated film has a dry film thickness less than 5 μm, weather resistance and hiding power are decreased due to the very thin film. Meanwhile, if the thickness exceeds 25 μm, the processability of the precoated metal sheet is somewhat decreased and preparation costs may increase. The dry film thickness is not limited thereto.

Also, when the coated film is dried at a temperature lower than 200° C., the film does not dry and cross-link, thus it is difficult to obtain desired properties of the film. On the other hand, if the film is dried at a temperature exceeding 250° C., the paint composition may be undesirably pyrolyzed.

The precoated metal sheet coated with the paint composition of the present invention can be employed in fields which require bio-effects having storage and maturation effects on food, growth promotion effects on plants, activation effects on water or the like, for example, the maintenance of food's freshness, promotion of blood circulation, etc.

A better understanding of the present invention may be obtained through the following inventive examples and comparative examples which are set forth to illustrate, but are not to be construed as the limit of the present invention.

EXAMPLE

Each component constituting a paint composition, shown in Table 1, below, was mixed in an amount shown in Table 1, below, to prepare paint compositions of Comparative Examples 2-10 and Inventive Examples 1-11. In Comparative Examples and Inventive Examples, when preparing each paint composition, ceramic powder was used in an amount shown in Table 1, below, based on 100 parts by weight of a polyester resin, and sufficiently stirred at 1000-5000 rpm so that the ceramic powder was uniformly dispersed in the resin. Subsequently, in cases of requiring the addition of phosphoric acid, additives, a silane compound, and a curing catalyst, they were added to the paint composition and sufficiently stirred at 1000-5000 rpm.

In Comparative Examples 2 and 3, a polyester resin having a molecular weight of about 3000 was used. In Comparative Example 4 and Inventive Examples 1 to 6, a polyester resin having a molecular weight of about 12000 was used. Also, in Comparative Examples 5 to 10 and Inventive Examples 7 to 11, a polyester resin having a molecular weight of about 15000 was used. The ceramic powder having a particle size of 15 μm was used.

Further, mercapto-propyl-trimethoxy silane and dodecylbenzenesulfonic acid were used as the silane compound and the curing catalyst, respectively.

In Comparative Examples and Inventive Examples, as the additives, 1.5 parts by weight of a defoaming agent, 0.4 parts by weight of a dispersing agent, 0.3 parts by weight of a leveling agent and 80 parts by weight of titanium dioxide as a coloring pigment were used, based on 100 parts by weight of the resin. Additionally, thinner was used as a solvent to obtain the viscosity requiring about 100-120 sec when the paint composition was discharged from a ford cup #4. The used components were mixed while being stirred at a high speed of 1000-5000 rpm. The defoaming agent, the dispersing agent and the leveling agent were purchased from BYK-CHEMIE GmbH, Germany. BYK 051 and BYK 171 were used as the defoaming agent and the dispersing agent, respectively, and BYK 357 was used as the leveling agent.

A metal sheet having a size of 20×10 cm was coated with each of the paint compositions of Comparative Examples 2-10 and Inventive Examples 1-11. As such, before coating, the metal sheet had been pretreated with chromate at a thickness of about 1 μm and then under coated with epoxy anticorrosive paint at a thickness of about 5 μm. Each of the paint compositions of Comparative Examples 2-10 and Inventive Examples 1-11 was applied to a dry film thickness of 15 μm. The coating method was conducted using a bar coating process. The paint was dried at 232° C. as an actual preparation temperature for 24 sec, to manufacture a test sample. In Comparative Example 1, there was used a metal sheet for home appliances available from POCOS Co. Ltd., Korea, which had been treated with chromate at a thickness of about 1 μm, under coated with epoxy at a thickness of about 5 μm and then top coated with polyester at a thickness of about 20 μm.

Each test sample was measured for coating processability, solvent resistance, gloss, storability, antibiotic activity and far-infrared emissivity in accordance with the following procedures. The results are shown in Table 1, below.

1) Processability was assayed in such a way that the test sample was bent at 180° to have 3t curved surfaces, and thus, whether cracks were generated at bended surfaces was confirmed. As the results, the case where cracks were generated was determined to be 'poor', while the case where no cracks were generated was determined to be 'good'.

2) Solvent resistance was assayed in such a way that when the coated metal sheet was rubbed with a gauze dipped into MEK under a load of 1 kg, the number of rubs was counted until the top coated surface was peeled off and thus the under coated surface was seen. As such, a reciprocating rub was taken as one rub.

3) Gloss was assayed in such a way that surface gloss was measured using a 60° glossmeter.

4) Storage stability was assayed in such a way that 30 days after the paint composition was prepared, the state of the paint was observed with the naked eye. As the results, the case where the precipitate was not gelled was determined to be 'good', while the case where it was gelled was determined to be 'poor'.

5) Antibiotic activity was assayed in such a way that antibiotic activity of the metal sheet was tested in accordance with a pressurization close adhesion method (KICM-FIR-1002) of Korea Institute of Construction Materials. For test, *Escherichia coil* and *Pseudomonas aeruginosa* were inoculated to a standard test sample and a metal sheet test sample coated with the paint composition including antibiotic radioactive powder, and then, the inoculated samples were covered with other non-inoculated metal sheet samples and cultured at 37° C. for 24 hours. The bacterial death rate was measured as a rate of bacterial reduction.

6) Far-infrared emissivity was assayed in such a way that far-infrared emissivity of the precoated metal sheet was measured at a wavelength of 5-20 μm in accordance with a KS standard test method (KS L 2514 6.4) as test provision of far-infrared emissivity of KICM (Center of Far-infrared Applied Estimation).

TABLE 1

| Sample | Composition (parts by wt) | Process. | Solvent Resis. (Number) | Gloss | Storability | E. Coli/ P. aeruginosa Reduct. (%) | Far-Infrared Emissivity |
|---|---|---|---|---|---|---|---|
| C.1 | Con. Precoated Metal Sheet | Good | 50 or more | 75 | Good | Less Than 10 | 0.86 |
| C.2 | PE(100)/CaCO$_3$(20)/ZnO(20)/Al$_2$O$_3$(20)/SiO$_2$(15) | Poor | 50 or more | 17 | Good | 99.9 | 0.958 |
| C.3 | PE(100)/CaCO$_3$(20)/ZnO(20)/SiO$_2$(15) | Poor | 50 or more | 21 | Good | 99.9 | 0.947 |
| C.4 | PE(100)/CaCO$_3$(5)/ZnO(5)/Al$_2$O$_3$(5) | Good | 7 | 84 | Good | 56 | 0.922 |
| C.5 | PE(100)/CaCO$_3$(10)/ZnO(10)/Al$_2$O$_3$(10) | Good | 4 | 79 | Good | 99.9 | 0.924 |
| C.6 | PE(100)/CaCO$_3$(20)/ZnO(20)/Al$_2$O$_3$(5) | Good | 3 | 29 | Good | 99.9 | 0.934 |
| I.1 | PE(100)/CaCO$_3$(5)/ZnO(5)/Al$_2$O$_3$(5)/ Phosphoric Acid(0.5) | Good | 50 or more | 78 | Good | 70 | 0.925 |
| C.7 | PE(100)/CaCO$_3$(20)/ZnO(20)/Al$_2$O$_3$(25)/ Phosphoric Acid(3.1) | Good | 50 or more | 31 | Poor | 99.9 | 0.944 |
| C.8 | PE(100)/CaCO$_3$(25)/ZnO(20)/Al$_2$O$_3$(20)/ Phosphoric Acid(4.0) | Poor | 50 or more | 33 | Poor | 99.9 | 0.948 |
| C.9 | PE(100)/CaCO$_3$(25)/ZnO(25)/Al$_2$O$_3$(15)/ Phosphoric Acid(0.9) | Poor | 50 or more | 36 | Good | 99.9 | 0.932 |
| C.10 | PE(100)/CaCO$_3$(5)/ZnO(30)/Al$_2$O$_3$(27)/ Phosphoric Acid(1.7) | Poor | 50 or more | 29 | Poor | 99.9 | 0.937 |
| I.2 | PE(100)/CaCO$_3$(3)/ZnO(3)/Al$_2$O$_3$(3)/ Phosphoric Acid(0.70)/ Silane(0.07)/Curing Catalyst(5) | Good | 50 or more | 91 | Good | 45 | 0.929 |
| I.3 | PE(100)/CaCO$_3$(5)/ZnO(5)/Al$_2$O$_3$(5)/ Phosphoric Acid(0.7)/ Silane(0.07)/Curing Catalyst(5) | Good | 50 or more | 83 | Good | 65 | 0.935 |
| I.4 | PE(100)/CaCO$_3$(10)/ZnO(10)/Al$_2$O$_3$(5)/ Phosphoric Acid(1.0)/ Silane(0.2)/Curing Catalyst(6) | Good | 50 or more | 79 | Good | 99.9 | 0.938 |
| I.5 | PE(100)/CaCO$_3$(10)/ZnO(5)/Al$_2$O$_3$(5)/ Phosphoric Acid(0.7)/ Silane(0.7)/Curing Catalyst(5) | Good | 50 or more | 89 | Good | 87 | 0.944 |
| I.6 | PE(100)/CaCO$_3$(3.5)/ZnO(3.5)/Al$_2$O$_3$(3.5)/ Phosphoric Acid (0.7)/ Silane(0.7)/Curing Catalyst(4.7) | Good | 50 or more | 93 | Good | 55 | 0.932 |

TABLE 1-continued

| Sample | Composition (parts by wt) | Process. | Solvent Resis. (Number) | Gloss | Storability | E. Coli/ P. aeruginosa Reduct. (%) | Far-Infrared Emissivity |
|---|---|---|---|---|---|---|---|
| I.7 | PE(100)/CaCO$_3$(5)/ZnO(5)/Al$_2$O$_3$(5)/ Phosphoric Acid(0.8)/ Silane(0.8)/Curing Catalyst(5.11) | Good | 50 or more | 91 | Good | 70 | 0.948 |
| I.8 | PE(100)/CaCO$_3$(6.5)/ZnO(6.5)/Al$_2$O$_3$(6.5)/ Phosphoric Acid(0.7)/ Silane(0.7)/Curing Catalyst(4.7) | Good | 50 or more | 87 | Good | 99.9 | 0.926 |
| I.9 | PE(100)/CaCO$_3$(6.5)/Al—Zn(13)/ Phosphoric Acid(0.7)/ Silane(0.7)/Curing Catalyst(4.7) | Good | 50 or more | 86 | Good | 99.9 | 0.925 |
| I.10 | PE(100)/CaCO$_3$(6.5)/Al—Zn(3)/ Phosphoric Acid(0.70)/ Silane(0.07)/Curing Catalyst(5) | Good | 50 or more | 94 | Good | 36 | 0.911 |
| I.11 | PE(100)/CaCO$_3$(3)/ZnO(3)/Al$_2$O$_3$(3)/Al—Zn(20)/ Phosphoric Acid(0.70)/ Silane(0.07)/Curing Catalyst(5) | Good | 50 or more | 65 | Good | 99.9 | 0.937 |

As is apparent from Table 1, a conventional precoated metal sheet of Comparative Example 1 exhibits low antibiosis having a rate of bacterial reduction less than 10%, and has low far-infrared emissivity of 0.86. In Comparative Examples 2 and 3 using the polyester resin having a molecular weight of 3000-4000, although an excessive amount of the ceramic powder is used, silica is also used, thus manifesting good solvent resistance and storability. However, processability and high gloss required for home appliances are poor, and thus, conventional metal sheets cannot be used for home appliances.

In Comparative Examples 4-6 without the use of phosphoric acid, CaCO$_3$, ZnO and Al$_2$O$_3$ are used in larger amounts, based on the polyester resin, and thus, far-infrared emissivity increases but solvent resistance decreases.

In Comparative Examples 7 to 10, properties unsuitable for use in home appliances are shown due to the use of larger amounts of ceramic powder, in spite of using phosphoric acid.

In Inventive Examples having the ceramic powder, phosphoric acid, silane and curing catalyst mixed at appropriate ratios, processability, solvent resistance, gloss, storability, and far-infrared emissivity are exhibited to be high, and as well, higher antibiotic activity of 50-99.9% is manifested, compared to conventional precoated metal sheets.

As described above, the present invention provides a paint composition including ceramic powder and phosphoric acid, and a precoated metal sheet coated with the paint composition, in which far-infrared emissivity and antibiotic activity are excellent, and as well, the alkalinity of the ceramic powder is neutralized by phosphoric acid, to increase the storage stability and solvent resistance. Further, the silane compound and the curing catalyst are additionally used, whereby gloss and processability are improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A paint composition having far-infrared emissivity and antibiotic activity, comprising a thermosetting resin, 9-60 parts by weight of ceramic powder and 0.2-4.0 parts by weight of phosphoric acid, based on 100 parts by weight of the thermosetting resin.

2. The paint composition according to claim 1, wherein the thermosetting resin comprises at least one resin selected from the group consisting of polyester resin, silicone modified polyester resin and acryl resin, each of which has a molecular weight of 10,000 or more.

3. The paint composition according to claim 2, wherein the thermosetting resin is a polyester resin or an acryl resin having a molecular weight of 10,000 or more.

4. The paint composition according to claim 2, wherein the thermosetting resin has a molecular weight of 10,000-20,000.

5. The paint composition according to claim 1, wherein the ceramic powder comprises at least one selected from the group consisting of CaCO$_3$, ZnO, and Al$_2$O$_3$.

6. The paint composition according to claim 5, wherein the ceramic powder comprises 3-20 parts by weight of CaCO$_3$, 3-20 parts by weight of ZnO, and 3-20 parts by weight of Al$_2$O$_3$, based on 100 parts by weight of the thermosetting resin.

7. The paint composition according to claim 6, wherein the ceramic powder comprises 5-10 parts by weight of CaCO$_3$, 5-10 parts by weight of ZnO, and 5-10 parts by weight of Al$_2$O$_3$, based on 100 parts by weight of the thermosetting resin.

8. The paint composition according to claim 5, wherein the ceramic powder further comprises 3-20 parts by weight of Al—Zn ceramic powder, based on 100 parts by weight of the thermosetting resin.

9. The paint composition according to claim 1, further comprising a coloring pigment, a dispersing agent, a leveling agent and/or a thickening agent.

10. The paint composition according to claim 9, wherein at least one additive selected from the group consisting of the dispersing agent, the leveling agent and the thickening agent is used in an amount of 1.0-7.0 parts by weight, based on 100 parts by weight of the thermosetting resin.

11. The paint composition according to claim 9, wherein the coloring pigment is used in an amount of 10-80 parts by weight, based on 100 parts by weight of the thermosetting resin.

12. The paint composition according to claim 1, further comprising 0.01-1.0 parts by weight of a silane compound, based on 100 parts by weight of the thermosetting resin.

13. The paint composition according to claim 12, wherein the silane compound comprises at least one selected from the group consisting of mercapto-propyl-trimethoxy silane, 3-aminopropyltriethoxy silane, 3-trimethoxysilylpropyl methacrylate, and 3-aminopropylmethoxy silane.

14. The paint composition according to claim 1, further comprising 2-6 parts by weight of a curing catalyst, based on 100 parts by weight of the thermosetting resin.

15. The paint composition according to claim 12, further comprising 2-6 parts by weight of a curing catalyst, based on 100 parts by weight of the thermosetting resin.

16. The paint composition according to claim 14, wherein the curing catalyst is dodecylbenzenesulfonic acid.

17. The paint composition according to claim 15, wherein the curing catalyst is dodecylbenzenesulfonic acid.

18. A precoated metal sheet coated with the paint composition of claim 1.

19. A precoated metal sheet coated with the paint composition of claim 12.

20. A precoated metal sheet coated with the paint composition of claim 14.

21. A precoated metal sheet coated with the paint composition of claim 15.

22. The precoated metal sheet according to claim 18, wherein the paint composition is applied to a dry film thickness of 5-25 μm.

23. The precoated metal sheet according to claim 19, wherein the paint composition is applied to a dry film thickness of 5-25 μm.

24. The precoated metal sheet according to claim 20, wherein the paint composition is applied to a dry film thickness of 5-25 μm.

25. The precoated metal sheet according to claim 21, wherein the paint composition is applied to a dry film thickness of 5-25 μm.

26. The precoated metal sheet according to claim 18, wherein the metal sheet is used for home appliances.

27. The precoated metal sheet according to claim 19, wherein the metal sheet is used for home appliances.

28. The precoated metal sheet according to claim 20, wherein the metal sheet is used for home appliances.

29. The precoated metal sheet according to claim 21, wherein the metal sheet is used for home appliances.

* * * * *